US011734438B2

(12) United States Patent
Talmat

(10) Patent No.: US 11,734,438 B2
(45) Date of Patent: Aug. 22, 2023

(54) SECURE MANAGEMENT SCRIPT DEPLOYMENT

(71) Applicant: ServiceNow, Inc., Santa Clara, CA (US)

(72) Inventor: Mohamed Sofiane Talmat, Utrecht (NL)

(73) Assignee: ServiceNow, Inc., Santa Clara, CA (US)

( * ) Notice: Subject to any disclaimer, the term of this patent is extended or adjusted under 35 U.S.C. 154(b) by 377 days.

(21) Appl. No.: 17/086,177

(22) Filed: Oct. 30, 2020

(65) Prior Publication Data

US 2022/0138334 A1 May 5, 2022

(51) Int. Cl.
*H04L 9/40* (2022.01)
*G06F 21/62* (2013.01)
*G06F 8/61* (2018.01)
*H04L 9/32* (2006.01)

(52) U.S. Cl.
CPC ............ *G06F 21/6209* (2013.01); *G06F 8/62* (2013.01); *H04L 9/3247* (2013.01); *G06F 2221/2101* (2013.01)

(58) Field of Classification Search
CPC .................... G06F 21/6209; G06F 8/62; G06F 2221/2101; H04L 9/3247
See application file for complete search history.

(56) References Cited

U.S. PATENT DOCUMENTS

| | | | | |
|---|---|---|---|---|
| 6,118,796 | A * | 9/2000 | Best | H04Q 11/0471 370/252 |
| 6,470,346 | B2 * | 10/2002 | Morwood | G06F 9/5044 |
| 8,429,287 | B2 * | 4/2013 | Sullivan | H04L 65/612 709/203 |
| 9,805,177 | B1 * | 10/2017 | Chakravarthy | G06F 21/6227 |
| 10,038,688 | B2 * | 7/2018 | Nichols | G06F 21/41 |
| 10,482,404 | B2 * | 11/2019 | Theebaprakasam | G06Q 10/0631 |
| 2004/0215767 | A1 * | 10/2004 | Fukunari | G06Q 10/06 709/224 |
| 2005/0053010 | A1 * | 3/2005 | Smith | H04L 67/14 370/252 |
| 2007/0083813 | A1 * | 4/2007 | Lui | G06F 11/3612 709/224 |

(Continued)

OTHER PUBLICATIONS

Duncan Tweed. Restricting paths on which you can execute discovery commands. May 8, 2019.

*Primary Examiner* — Ghodrat Jamshidi
(74) *Attorney, Agent, or Firm* — Van Pelt, Yi & James LLP

(57) ABSTRACT

An indication is received to initiate a resource discovery process of a client system. The client system includes resources to be discovered and the resource discovery process is associated with a script. A connection is made from a management server to the client system with a first level of security privileges of the client system. The client system is provided with an encapsulation program for an execution of the script. The encapsulation program is configured to determine ownership information of the script. The encapsulation program is also configured to cause the execution of the script on the client system with modified security privileges corresponding to the ownership information of the script rather than the first level of security privileges of the client system.

20 Claims, 5 Drawing Sheets

(56) References Cited

U.S. PATENT DOCUMENTS

| | | | |
|---|---|---|---|
| 2008/0104244 A1* | 5/2008 | Chen | H04L 67/51 |
| | | | 709/225 |
| 2011/0099255 A1* | 4/2011 | Srinivasan | H04L 63/20 |
| | | | 709/221 |
| 2011/0145360 A1* | 6/2011 | Sheshagiri | H04L 67/10 |
| | | | 717/110 |
| 2012/0317186 A1* | 12/2012 | Koidl | H04L 67/535 |
| | | | 709/203 |
| 2018/0097829 A1* | 4/2018 | Muttik | G06F 21/6245 |
| 2020/0019678 A1* | 1/2020 | Kunnath | G06F 21/41 |

* cited by examiner

SECURE MANAGEMENT SCRIPT DEPLOYMENT

BACKGROUND OF THE INVENTION

Script deployment to client machines can be utilized for a variety of network management services including resource discovery, resource management, event management, cloud management, maintenance, and compliance, among others. In some scenarios, a management server is utilized to automatically deploy scripts to one or more client machines of the network. The script may be a customized script that allows an administrator to execute any number of commands locally on a client machine. For example, a custom script can be deployed via a management server to each of the client machines of a network, such as a customer's private network, to perform one or more services, such as resource discovery. As the script executes on the various client machines, resource information is gathered and can be collected at the management server. The collected information can be utilized for system-wide analysis.

BRIEF DESCRIPTION OF THE DRAWINGS

Various embodiments of the invention are disclosed in the following detailed description and the accompanying drawings.

DETAILED DESCRIPTION

Figure 1:
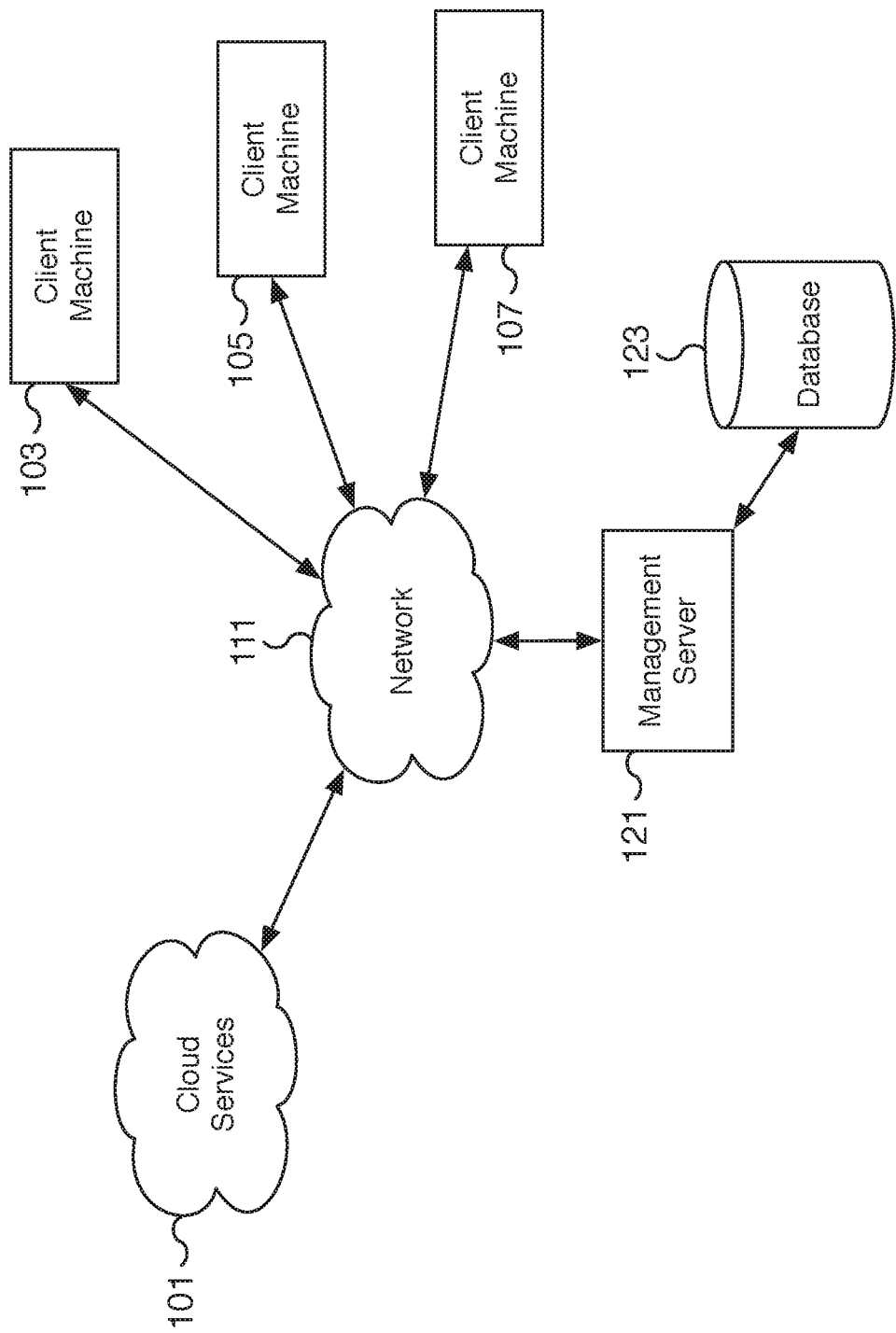
FIG. 1 is a block diagram illustrating an example of a network environment for securely deploying resource discovery scripts.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Secure deployment of management scripts to client machines is disclosed. Using the disclosed techniques, a custom script such as a script for resource discovery can be automatically deployed to one or more client machines in a secure manner. For example, one or more client machines of a local area network are specified to receive and execute a resource discovery script to collect resource information of the specified clients. The script can be a custom script and is deployed via a management server. The management server securely connects to each specified client. As part of the connection process, the management server uploads a security encapsulation program to execute on each client machine. In various embodiments, along with the security encapsulation, the management server also uploads the management script, such as a custom resource discovery script. In some embodiments, instead of uploading the management script, the script is retrieved by the client machine using a network location, for example, provided by the management server. The resource discovery script can be authored by any number of people, including by a customer for the customer's network, by an external service provider, or by another appropriate author. In various embodiments, the custom script can execute commands local to the client, including commands that can be abused if executed at the wrong privilege level. For example, the custom script can execute any number of local commands on the client, including commands that require different privilege settings as well as commands that are owned by different users and/or groups.

In various embodiments, the management script is securely deployed at least in part by utilizing the uploaded security encapsulation program. The encapsulation program is executed on the local machine and used to launch the management script. In some embodiments, the security encapsulation program functions as a wrapper or shell for the management script, executing the management script and intercepting any commands referenced in the script so that the script and the requested commands are executed in a secure mode. For example, the encapsulation program intercepts a request to execute a command and identifies the ownership information of the command, such as the user and/or group assigned to the command, the file location of the command, the read, write, and/or execution settings of the command, the users allowed to access the command, and/or the sharing settings of the command and/or its associated file location, among others. In some embodiments, the privilege settings are dropped to match those of the command before executing the command. For example, the user and group settings of a new process used to execute the command are set to the user and group settings of the intercepted command. The command is then executed using the new process with the appropriately configured privilege settings. By modifying the privilege settings to the appropriate level of the command, which can include potentially dropping the privilege settings to a lower privilege setting from a higher privilege setting, no commands of a custom management script are executed at a higher privilege setting than the privilege settings associated with the requested command itself. Utilizing this secure deployment framework allows a custom script the freedom to execute a wide range of local commands without unnecessarily exposing security holes and limiting the number and types of commands allowed to be executed by the script. The management script can be securely deployed for execution on client machines. In some embodiments, once the script is completed, the security encapsulation program is removed from the client machine. For example, the security encapsulation program and the deployed script can be deleted from the client machine once the script has finished its task such as collecting resource information of the client machine. In some embodiments, the security encapsulation program and one or more resource discovery scripts are included together. For example, an encapsulation program can embed or include resource discovery script functionality within it as a single package. As another example, a resource discovery script can include the encapsulation functionality. For example, a discovery script can include the encapsulation functionality as a sub-module to allow the script and in particular its commands to be securely executed using appropriate privilege settings on a client machine.

In some embodiments, resource discovery scripts are securely deployed to remote client machines for automated resource discovery. For example, in some embodiments, an indication to initiate a resource discovery process of a client system is received. For example, an administrator can initiate a resource discovery process via a web user interface. The initiated resource discovery process may specify multiple target client machines on which to execute a resource discovery script to identify each machines' relevant resources. In this example, the resource discovery process references a particular client system which has resources to be discovered. In some embodiments, a user can specify multiple client machines and/or networks for which resource discovery is performed. In some embodiments, the resource discovery process is associated with a script. For example, the administrator specifies a management script such as a resource discovery script that is deployed to each client machine and used to determine each client's resources. Client resources can include both hardware and software resources, among other resources. For example, information on hardware resources can include the amount and/or type of memory, properties and characteristics of available storage, processor specifications, and/or network interface descriptions, among others of a client system. Information on software resources can include the installed software applications and their corresponding versions as well as installed operating systems and their version numbers.

In some embodiments, the indication to initiate a resource discovery process of a client system is received at a management server. The management server connects to the client system with a first level of security privileges of the client system. For example, the management server connects via a secure connection as an administrative user with a corresponding first level of security privileges of the client system. In some embodiments, an encapsulation program for the execution of the resource discovery script is provided to the client system. For example, the management server uploads a security encapsulation program to the client system. The encapsulation program is configured to determine ownership information of a script, such as the discovery resource script, and cause execution of the script on the client system with modified security privileges. The modified security privileges can correspond to the ownership information of the script rather than the first level of security privileges of the client system. For example, ownership information such as the user identifier and group identifier of the script is determined and used to execute the script with the appropriate permission associated with the identified user and group identifiers. In various embodiments, the privileges associated with the owner of the script are used to execute the script thereby preventing the script from executing with a higher privilege setting than necessary. Although described with respect to deploying a single resource discovery script to a client system, the same process can be applied to deploy multiple scripts to the same client system. For example, each script is launched by the encapsulation program using the appropriate privilege settings based on the ownership information of that script.

In some embodiments, the encapsulation program in executing a script further intercepts requests made by the script to execute commands. For example, a resource discovery script may execute multiple commands, such as commands local to the client system, to determine resources associated with different hardware and/or software properties of the client system. Each command is executed at the appropriately determined privilege settings. For example, the request to execute each command is intercepted and ownership information is determined for the intercepted command to identify the appropriate level of privilege for execution. In some embodiments, the command is then executed in a new process using the determined ownership information, such as the user identifier associated with and/or owner of the requesting command. In some embodiments, the command is executed based on permissions associated with the command and/or the file location of the command. In various embodiments, the requesting command is script and/or binary on the local client system.

FIG. 1 is a block diagram illustrating an example of a network environment for securely deploying resource discovery scripts. In the example shown, cloud services 101, client machines 103, 105, and 107, and management server 121 are communicatively connected via network 111. Network 111 can be a public or private network. In some embodiments, network 111 is a public network such as the Internet. In some embodiments, client machines 103, 105, and/or 107 are on a private local network separate of cloud services 101. In some embodiments, management server 121 is also part of the local network of client machines 103, 105, and/or 107 although other network topologies are appropriate as well. In the example shown, cloud services 101 hosts cloud services such as configuration management database (CMDB) services. Services provided by cloud services 101 can include resource discovery, resource management, event management, cloud management, maintenance, and compliance services, among others.

In some embodiments, an administrator can initiate a cloud provided service such as resource discovery via cloud services 101. Cloud services 101 may be implemented by one or more servers and/or databases (not shown). In some embodiments, an administrator accesses the services via a user interface such as a web user interface. For example, an administrator can configure a resource discovery service to collect resource information of client systems such as client machines 103, 105, and/or 107. In some embodiments, the administrator specifies one or more resource discovery scripts to deploy to the target client systems. In the example shown, the discovery scripts are deployed using management server 121.

In some embodiments, management server 121 is a network client used to securely deploy management scripts to target client systems such as client machines 103, 105, and/or 107. In the example shown, management server 121 is physically separated from cloud services 101 to denote the scenario where management server 121 can be in a different network location from cloud services 101. In may be appropriate, in some embodiments, for management server 121 to be part of and/or located with cloud services 101. In some embodiments, management server 121 is located on the same private network of client machines 103, 105, and/or 107 for improved security. For example, network connections between management server 121 and cloud services 101 related to service requests can require that the network connections originate from an internal network via management server 121 instead of allowing incoming requests to the internal network.

In some embodiments, client machines 103, 105, and/or 107 are example client hardware/software systems with potential different resources that require discovery and management. Client machines such as client machines 103, 105, and/or 107 may be Unix-based machines such as Linux servers or run another operating system such as Windows, MacOS, etc. In some embodiments, the client machines are Windows servers, desktop machines, routers, storage devices, virtual machines, etc. In various embodiments, the configurations of the different client machines are cataloged using cloud services 101 with a service such as a CMDB service. The resources available for each client machine and its associated properties can be stored in a database such as database 123. In some embodiments, the information is stored in a CMDB database.

In various embodiments, management server 121 can securely connect to one or more client systems such as client machines 103, 105, and/or 107 and remotely deploy one or more discovery scripts. The scripts can be deployed using a secure encapsulation program that limits the privilege settings for the scripts and the embedded commands called by the scripts. In various embodiments, information collected by the scripts, such as resource discovery information, can be returned to management server 121 and/or stored in a remote database such as database 123.

In some embodiments, database 123 is utilized to store information collected by deploying management scripts to client systems. In some embodiments, database 123 is a CMDB database. For example, database 123 can be used to store resource discovery information as part of a CMDB service for managing client resources. Although database 123 is shown connected to management server 121, database 123 may be located in a variety of network locations as appropriate. For example, database 123 may be located external to a local network that includes client machines 103, 105, and/or 107 and management server 121. In some embodiments, database 123 is not directly connected to management server 121 but only communicatively connected to management server 121. Database 123 may also be used to store management scripts, such as resource discovery scripts. In some embodiments, the scripts may be stored and/or cached at management server 121 and/or stored using cloud services 101. In some embodiments, database 123 is a cloud-based database server and may be part of and/or collocated with cloud services 101.

Although single instances of some components have been shown to simplify the diagram of FIG. 1, additional instances of any of the components shown in FIG. 1 may also exist. For example, cloud services 101 may include one or more different servers and/or multiple distributed components. Similarly, database 123 may include one or more database servers and may not be directly connected to management server 121. For example, database 123 and its components may be replicated and/or distributed across multiple servers, components, and/or locations. In some embodiments, components not shown in FIG. 1 may also exist.

Figure 2:
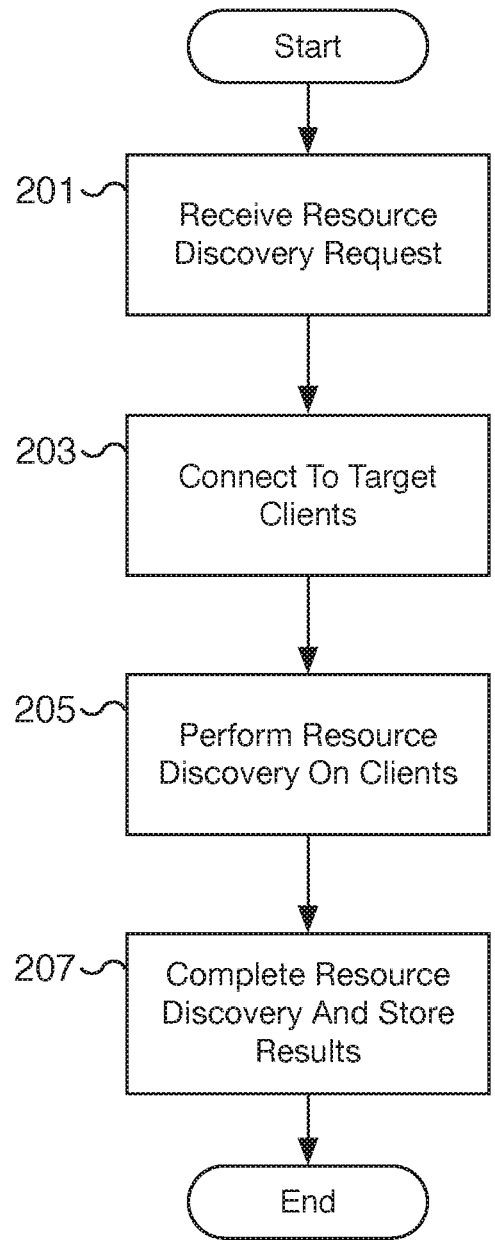
FIG. 2 is a flow chart illustrating an embodiment of a process for securely deploying resource discovery scripts to a client system.

FIG. 2 is a flow chart illustrating an embodiment of a process for securely deploying resource discovery scripts to a client system. In some embodiments, the process of FIG. 2 is performed at a management server such as management server 121 of FIG. 1 to identify resources associated with client systems such as one or more of client machines 103, 105, and/or 107 of FIG. 1. The process may be initiated via a cloud service such as a resource discovery service of cloud services 101 of FIG. 1.

At 201, a resource discovery request is received. The received request may specify one or more client machines. For example, the request may specify clients by identifiers such as IP addresses, IP ranges, and/or IP masks. In some embodiments, the clients are specified by a particular network and the resource discovery task is performed on all appropriate clients on the network. The request may also specify one or more discovery scripts to execute on the specified clients. In some embodiments, the specified scripts are associated with user and/or group permissions. For example, each discovery script may be associated with a particular user with specific user permissions and/or privileges. In various embodiments, the request is received at a management server such as management server 121 of FIG. 1. Although the request is received at the management server, the network connection over which the request is received may be initiated by the management server. For example, an administrator may initiate a resource discovery task via a cloud service. A management server may initiate a network connection to the cloud service and receive any pending requests.

At 203, a connection is made to each of the target client systems. For example, for each target client system specified by the network request, a connection is made from the management server to the target client system. In some embodiments, the connection is a secure and authenticated network connection. The connections to the different specified target clients and the respective deployment of the resource discovery scripts can be performed in parallel and/or sequentially. For example, steps 203, 205, and/or 207 can be performed in parallel and/or sequentially for each target client system.

At 205, resource discovery is performed on the client systems. For example, the resource discovery scripts are executed at each of the client systems. In some embodiments, a secure encapsulation program is uploaded by the management server to each of the client systems. If not already available at the client system, the resource discovery scripts are also uploaded to each appropriate client system. For example, a script can be uploaded by the management server to a client system, a client system can pull a script from another network location such as a cloud provider or database server, or the script can be provided via another channel. In various embodiments, the resource discovery scripts are launched using the provided secure encapsulation program. The encapsulation program determines the appropriate privileges to execute the discovery scripts, potentially dropping the privilege settings to execute each script to lower and less privileged settings and/or with different access privileges as appropriate. In some embodiments, the encapsulation program further intercepts commands included in any of the scripts. For example, a script can request to execute multiple commands such as multiple local scripts and/or binaries. The encapsulation program intercepts each of the command requests and runs them in a secure mode by determining the appropriate privilege level to execute an intercepted command and then executing the command with the appropriate privileges. In various embodiments, different commands of the same script can execute with different privileges. The appropriate privilege settings may be determined based on the ownership information and related permissions of the scripts and/or embedded commands. As each script executes, the deployed scripts gather resource information of the client system.

In some embodiments, the security encapsulation program and one or more resource discovery scripts are included together. For example, an encapsulation program can embed or include resource discovery script functionality within it as a single package. As another example, a resource discovery script can include the encapsulation functionality. For example, a discovery script can include the encapsulation functionality as a sub-module to allow the script and in particular commands called from the discovery script to be securely executed using the appropriate privilege settings. In some embodiments, the encapsulation program and a resource discovery script are executed as a single unified program that includes both the encapsulation functionality and the resource discovery functionality.

At 207, resource discovery is completed and the results are stored. For example, resource information for each client system is gathered and stored. The stored information can be used to manage the target systems and their installed services/applications, for example, via a cloud service such as a CMDB service. In some embodiments, the collected information is stored in a CMDB database such as database 123 of FIG. 1. In various embodiments, the discovered resource information of each client system is first returned from the target client system to a management server such as management server 121 of FIG. 1 before being provided for storage in a database such as a CMDB database. In some embodiments, as part of the resource discovery completion step, the encapsulation program is removed from each target client system. The discovery scripts may also be removed from each target client system. In some embodiments, the discovery scripts are cached at the management server for future resource discovery tasks.

Figure 3:
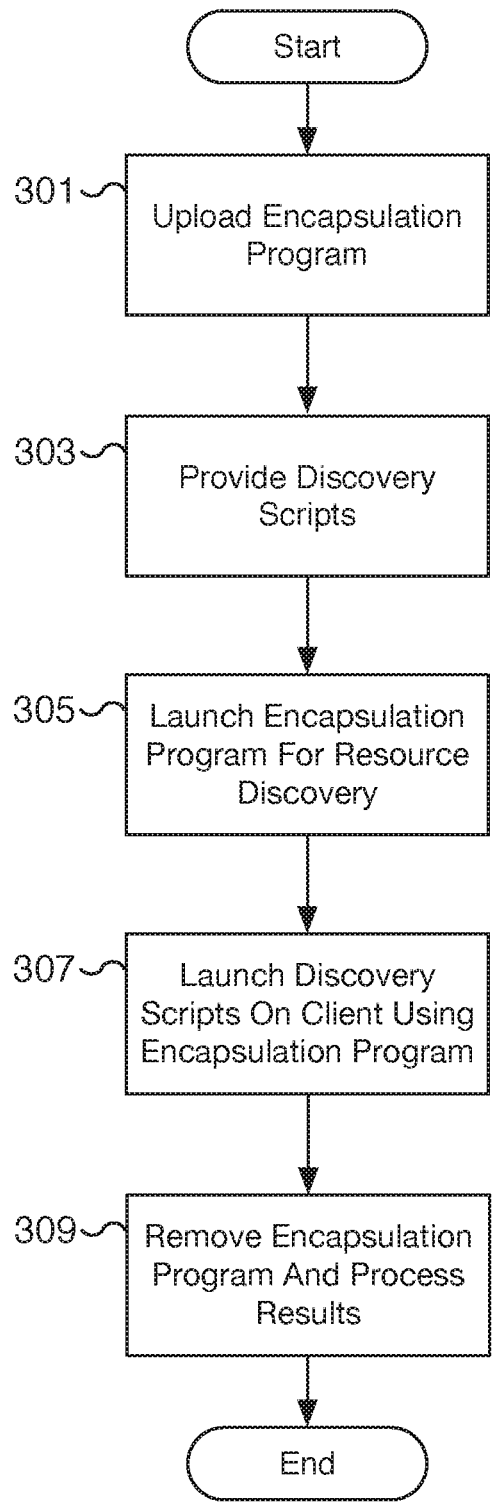
FIG. 3 is a flow chart illustrating an embodiment of a process for securely executing resource discovery scripts on a client system.

FIG. 3 is a flow chart illustrating an embodiment of a process for securely executing resource discovery scripts on a client system. In some embodiments, the process of FIG. 3 is initiated and performed by a management server once a connection to a client system has been established from the management server. The connection may be established as part of a resource discovery task initiated via a cloud-based resource discovery service. For example, a management server such as management server 121 of FIG. 1 is connected via a secure connection, such as a secure shell (SSH) connection, to a client system such as one of client machines 103, 105, and/or 107 of FIG. 1. In some embodiments, steps 301, 303, 305, and/or 307 are performed at 205 of FIG. 2 and/or step 309 is performed at 207 of FIG. 2.

At 301, an encapsulation program is uploaded to the client system. For example, a security encapsulation program is uploaded from the management server to the client system. The encapsulation program can function as a wrapper and/or shell for securely launching and executing resource discovery scripts. In some embodiments, the encapsulation program is uploaded to the client system using administrator privileges that allow the encapsulation program to execute with broader access privileges than at least some portions of the discovery scripts require. In some embodiments, the encapsulation program is not uploaded directly from the management server. For example, the encapsulation program can be retrieved by the client system from a different network location, such as from a cloud-based storage location.

At 303, discovery scripts are provided for the client system. In various embodiments, the discovery scripts are provided for execution at the client system. The scripts may be uploaded from the management server to the client system, may be stored in advance locally on the client system, may be retrieved by the client system from a different network location than the management server, such as from a cloud-based storage location or script repository, or may be provided via another appropriate technique. In some embodiments, different client systems are provided with different resource discovery scripts. The scripts may be custom scripts and may be authored and/or modified by a customer without prior validation/auditing. As custom scripts, a script may execute a variety of commands including local commands on the client system. The ability to execute more than a fixed list of commands without prior validation or auditing requires that the scripts be executed in a secure mode to minimize security threats. In some embodiments, the discovery scripts are included as part of the encapsulation program. For example, the scripts and encapsulation program are packaged together as a single deployable unit provided to the client system. In some embodiments, the discovery scripts are embedded within the encapsulation program or vice versa. For example, the encapsulation program functionality may be utilized by the discovery script.

At 305, the encapsulation program is launched for resource discovery. For example, the encapsulation program provided at 301 is launched on the client system. In various embodiments, the encapsulation program is launched with administrative security privileges and/or with high privilege settings. The advanced privilege settings may be based on a network user's privileges and/or the privileges of a local user of the client system. Any discovery scripts that will be executed are run within the context of the launched encapsulation program.

At 307, discovery scripts are launched on the client using the encapsulation program. For example, the encapsulation program is used to launch the discovery scripts provided at 303. In some embodiments, the scripts are launched in a pre-configured sequence, such as in a predefined sequential order. The scripts are launched in a secure mode by encapsulating their execution using the encapsulation program. For example, prior to executing a resource discovery script, the encapsulation program first identifies ownership information associated with a script to determine the appropriate privilege settings. The appropriate privilege settings are then used to execute the script.

In some embodiments, the ownership information includes identifying the user and/or group associated with a resource discovery script. A new process can be spawned with the identified user and group information and used to execute the resource discovery script. The resource discovery script is executed with privilege settings of the owner of the script. In some embodiments, the ownership information is based on the file location and/or access settings of the script. For example, depending on the granularity of privilege settings of the client system, sharing properties of the script can be used to determine the execution privileges of the script.

In some embodiments, once a resource discovery script is launched by the encapsulation program, the encapsulation program further intercepts commands included in the resource discovery script. For example, a script can request to execute multiple commands such as multiple local scripts and/or binaries. The encapsulation program intercepts each of the command requests and runs them in a secure mode by determining the appropriate privilege level to execute an intercepted command and then executing the command with the appropriate privileges. As each script executes, the deployed scripts gather resource information of the client system.

At 309, the encapsulation program is removed, and the resource discovery results are processed. For example, the encapsulation program uploaded to the client system at 301 is removed from the client machine. In some embodiments, the discovery scripts are also removed. For example, the discovery scripts are deleted from the client system but may be cached at the management server for future resource discovery tasks. In some embodiments, the resource discovery results are processed as directed by the management server. For example, the deployed script gathers resource information of the client system and the results are returned to the management server over a pre-established connection. The results can be stored in a database such as database 123 of FIG. 1. In some embodiments, the resource discovery results are stored with an identifier of the client system in a CMDB database. In some embodiments, the results may be stored to a data storage bypassing the management database. For example, in some embodiments, the encapsulation program provides storage hooks to write results via a connection to a remote data store. In various embodiments, along with resource discovery information, progress and/or performance information on the resource discovery task is also stored. For example, changes in privilege such as drops in privilege to execute scripts and/or embedded commands of a script are also stored. The privilege settings and/or user/group settings used to execute commands are stored. In some embodiments, the progress and/or performance information on the resource discovery task is used for security audits.

Figure 4:
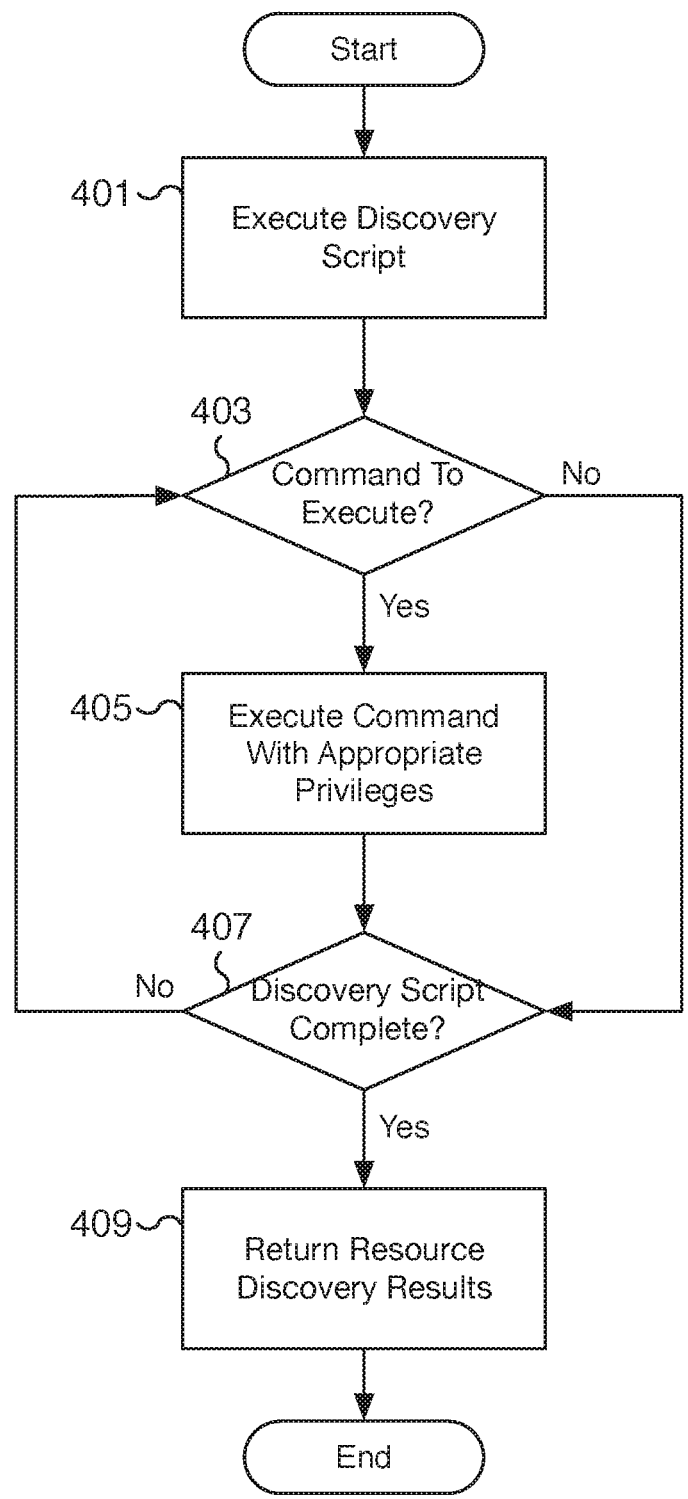
FIG. 4 is a flow chart illustrating an embodiment of a process for securely executing a resource discovery script with embedded commands on a client system.

FIG. 4 is a flow chart illustrating an embodiment of a process for securely executing a resource discovery script with embedded commands on a client system. In some embodiments, the process of FIG. 4 is used to intercept requested commands included in a resource discovery script and execute them in a secure mode. In some embodiments, the process of FIG. 4 is performed using an encapsulation program provided to a client system by a management server. The encapsulation functionality can be provided separate from the resource discovery script or embedded together with the resource discovery script. When embedded together, the encapsulation program and resource discovery script may be executed as a single unified program with modifications to security privileges performed as appropriate based on the requested commands of the resource discovery script. In some embodiments, the client system is one of client machines 103, 105, and/or 107 of FIG. 1 and the management server is management server 121 of FIG. 1. In some embodiments, the process of FIG. 4 is performed at 205 and/or 207 of FIG. 2 and/or at 307 and/or 309 of FIG. 3.

At 401, a resource discovery script is executed. For example, a resource discovery script is executed using an encapsulation program. The script may be a custom script that includes requests to execute additional commands such as local binaries and/or scripts to collect dedicated resource information. In some embodiments, the script is executed in its own process with the appropriate privilege settings associated with the resource discovery script.

At 403, a determination is made whether there exists a command of the resource discovery script to execute. For example, a determination is made where the script includes requests to execute additional commands. In the event there exists a command to execute, processing proceeds to 405. In the event no additional commands exist to execute, processing proceeds to 407.

At 405, a command is executed with the appropriate privileges. For example, the command requested for execution by the resource discovery script at 403 is intercepted and executed with the appropriate privileges. In some embodiments, the encapsulation program determines ownership information of the requested command. Ownership information may include the user and/or group identifiers of the command. In some embodiments, the ownership information may specify access privileges associated with the command. For example, the file path of the command may have associated read, write, and/or execute permissions. In various embodiments, the associated privileges identified based on ownership information are utilized to execute the command. For example, the command may be executed as a newly spawned process that is granted only the appropriate privileges. In some embodiments, the new process is created using a user and/or group identifier of the command. The new process is utilized to encapsulate the execution of the command within the new process. In various scenarios, the intercepted command can be executed with privilege settings that are lower than the enclosing script. The lowered privilege settings reduce the risk that the command is executed with unnecessary privileges.

At 407, a determination is made whether the resource discovery script has completed. In the event the resource discovery script has completed, processing proceeds to 409. In the event the resource discovery script has not completed, processing loops back to 403.

At 409, resource discovery results are return. For example, resource discovery information is returned to the management server or to another storage location. In some embodiments, processing results of the resource discovery task such as drops in user privileges and/or the privileges used to execute different scripts and/or commands are returned to the management server or to another storage location.

Figure 5:
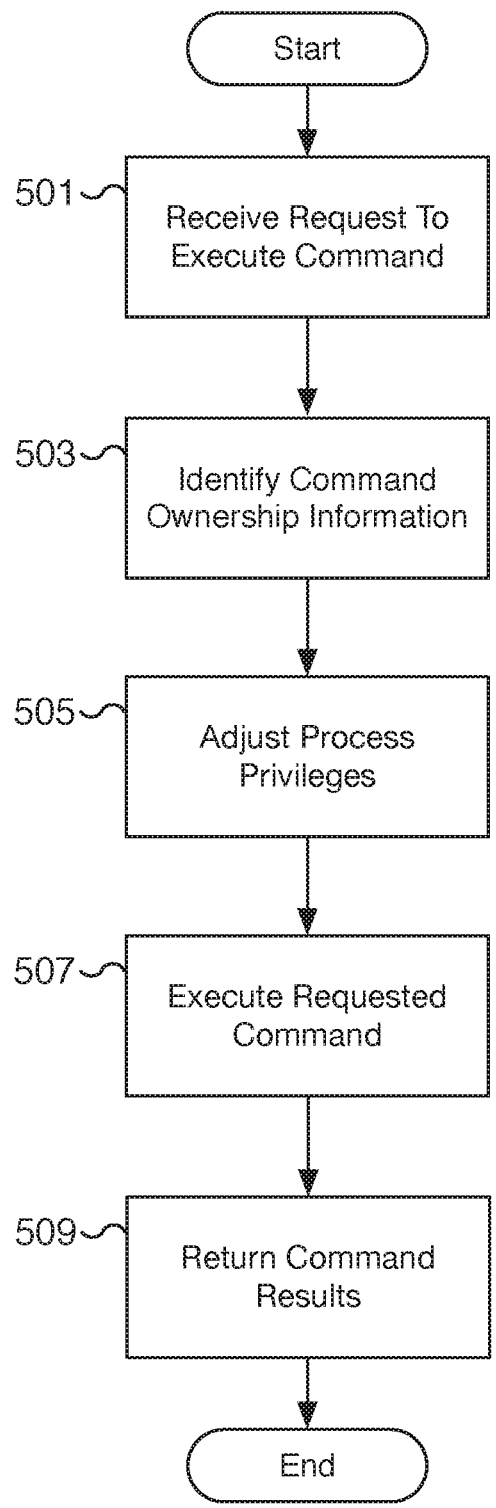
FIG. 5 is a flow chart illustrating an embodiment of a process for securely executing an embedded command of a resource discovery script on a client system.

FIG. 5 is a flow chart illustrating an embodiment of a process for securely executing an embedded command of a resource discovery script on a client system. In some embodiments, the process of FIG. 5 is used to securely execute an intercepted command included in a resource discovery script. In some embodiments, the process of FIG. 5 is performed as part of the process of FIG. 4 using the encapsulation program provided to a client system by a management server and used to launch the resource discovery script. In some embodiments, the encapsulation program and resource discovery script are provided together. In some embodiments, the client system is one of client machines 103, 105, and/or 107 of FIG. 1 and the management server is management server 121 of FIG. 1. In some embodiments, the process of FIG. 5 is performed at 205 of FIG. 2, at 307 of FIG. 3, and/or at 405 of FIG. 4.

At 501, a request to execute a command is received. For example, an encapsulation program processing a resource discovery script receives a request to execute a command included as part of the resource discovery script. The requested command may be a local command such as binary or script located on the client system. At 501, the command requested for execution is first intercepted and identified as requiring additional processing to determine appropriate privilege settings before the command can be executed.

At 503, command ownership information is identified. For example, the command can be first inspected relative to the client system for ownership properties. In some embodiments, the ownership information includes determining a user and/or group owner of the command. In some embodiments, the ownership information includes determining access to the command including what users and/or groups have read, write, and/or execution access to the command. Additional properties can include what users have shared access to the command or the folder/location of the command. For example, users that have shared read and/or write access to the folder containing the command and/or the command itself are identified. In some embodiments, access privileges are determined based on the identified ownership information. For example, an operating system query can be made to determine access privileges associated with the user owner of the command. In some embodiments, a database query is made using the identified ownership information. For example, a database can store access privilege settings for different owners and/or ownership information based on the command.

At 505, process privileges are adjusted. For example, the privileges associated with a process used to prepare for the execution of the command received at 501 are modified. In some embodiments, the process is a new process. The process has its privileges modified based on the ownership information identified at 503. In some embodiments, the process is spawned using the identified user owner as the process owner, a user with shared execution access to the command as the process owner, or another appropriate user associated with the command and with limited access privileges as the process owner. In various embodiments, the process is granted modified privileges that may be different from the resource discovery script. For example, the process prepared for executing the command may be configured with fewer or lower privilege settings than the resource discovery script.

At 507, the requested command is executed. For example, the command requested for execution at 501 is executed using the process with its privileges adjusted at 505. In various embodiments, the process with modified privileges is used to encapsulate the execution of the command. By executing the command with modified privileges, including privileges that may be dropped relative to the resource discovery script and/or other commands of the script, the command is executed in a secure mode with limited but appropriate privileges. Unnecessary privilege escalation is avoided and only the necessary owner-based privileges are granted to the requested command. At 507, resource discovery sub-tasks can be performed by the command by executing the command using the identified owner-based privileges.

At 509, command results are returned. For example, the command executed at 507 returns resource discovery results to the calling resource discovery script. The results may be utilized by the resource discovery script that requested the command, for example, for further resource discovery tasks. In various embodiments, the results may include identification of software and/or hardware resources as well as intermediary resource discovery results. Subsequent portions of the resource discovery script may utilize the returned results for additional examination of resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an indication to initiate a resource discovery process of a client system, wherein the client system includes resources to be discovered, and wherein the resource discovery process is associated with a script;
connecting from a management server to the client system with a first level of security privileges of the client system;
providing to the client system an encapsulation program for an execution of the script, wherein the encapsulation program is configured to: determine ownership information of the script, identify an execution command of the script, determine ownership information of the execution command of the script, and cause an execution of the execution command with modified security privileges corresponding to the ownership information of the execution command different from the first level of security privileges of the client system; and
tracking the modified security privileges associated with the execution of the execution command including by:
receiving a record of the modified security privileges associated with the execution of the execution command; and
storing the received record of the modified security privileges associated with the execution of the execution command.

2. The method of claim 1, further comprising:
receiving a description of the resources of the client system at the management server; and
storing the received description of the resources of the client system.

3. The method of claim 1, wherein the script is a custom discovery script, and wherein the custom discovery script includes execution requests for a plurality of commands on the client system.

4. The method of claim 1, wherein the first level of security privileges of the client system are administrative security privileges.

5. The method of claim 1, wherein the first level of security privileges of the client system includes more privileges than the modified security privileges corresponding to the ownership information of the execution command.

6. The method of claim 1, further comprising removing the provided encapsulation program from the client system.

7. The method of claim 1, further comprising uploading the script to the client system.

8. The method of claim 1, further comprising providing to the client system a network location of the script for the client system to retrieve.

9. The method of claim 1, further comprising initiating deletion of the script from the client system.

10. The method of claim 1, wherein the encapsulation program is configured to intercept a plurality of execution commands of the script.

11. The method of claim 10, wherein the encapsulation program is configured to: parse the script to identify the execution command of the script.

12. The method of claim 1, wherein the ownership information of the execution command includes a user identifier and a group identifier.

13. The method of claim 12, wherein the encapsulation program is configured to:
spawn a new process, wherein the new process is configured using the user identifier associated with the ownership information of the execution command.

14. The method of claim 1, wherein the ownership information of the execution command includes a path location of the execution command.

15. The method of claim 1, wherein security privileges corresponding to the ownership information of the script includes more privileges than the modified security privileges corresponding to the ownership information of the execution command.

16. The method of claim 1, further comprising verifying a digital signature of the script.

17. A system, comprising:
one or more processors; and
a memory coupled to the one or more processors, wherein the memory is configured to provide the one or more processors with instructions which when executed cause the one or more processors to:
receive an indication to initiate a resource discovery process of a client system, wherein the client system includes resources to be discovered, and wherein the resource discovery process is associated with a script;
connect from a management server to the client system with a first level of security privileges of the client system;
provide to the client system an encapsulation program for an execution of the script, wherein the encapsulation program is configured to: determine ownership information of the script, identify an execution command of the script, determine ownership information of the execution command of the script, and cause an execution of the execution command with modified security privileges corresponding to the ownership information of the execution command different from the first level of security privileges of the client system; and
track the modified security privileges associated with the execution of the execution command including by being configured to:
receive a record of the modified security privileges associated with the execution of the execution command; and
store the received record of the modified security privileges associated with the execution of the execution command.

18. The system of claim 17, wherein the first level of security privileges of the client system are administrative security privileges.

19. The system of claim 17, wherein the first level of security privileges of the client system includes more privileges than the modified security privileges corresponding to the ownership information of the execution command.

20. A computer program product, the computer program product being embodied in a non-transitory computer readable storage medium and comprising computer instructions for:
receiving an indication to initiate a resource discovery process of a client system, wherein the client system includes resources to be discovered, and wherein the resource discovery process is associated with a script;
connecting from a management server to the client system with a first level of security privileges of the client system;
providing to the client system an encapsulation program for an execution of the script, wherein the encapsulation program is configured to: determine ownership information of the script, identify an execution command of the script, determine ownership information of the execution command of the script, and cause an execution of the execution command with modified security privileges corresponding to the ownership information of the execution command different from the first level of security privileges of the client system; and
tracking the modified security privileges associated with the execution of the execution command including by:
receiving a record of the modified security privileges associated with the execution of the execution command; and
storing the received record of the modified security privileges associated with the execution of the execution command.

\* \* \* \* \*